June 7, 1966  R. O. DORR  3,254,427
FILM TREATING APPARATUS
Filed July 23, 1962  2 Sheets-Sheet 1
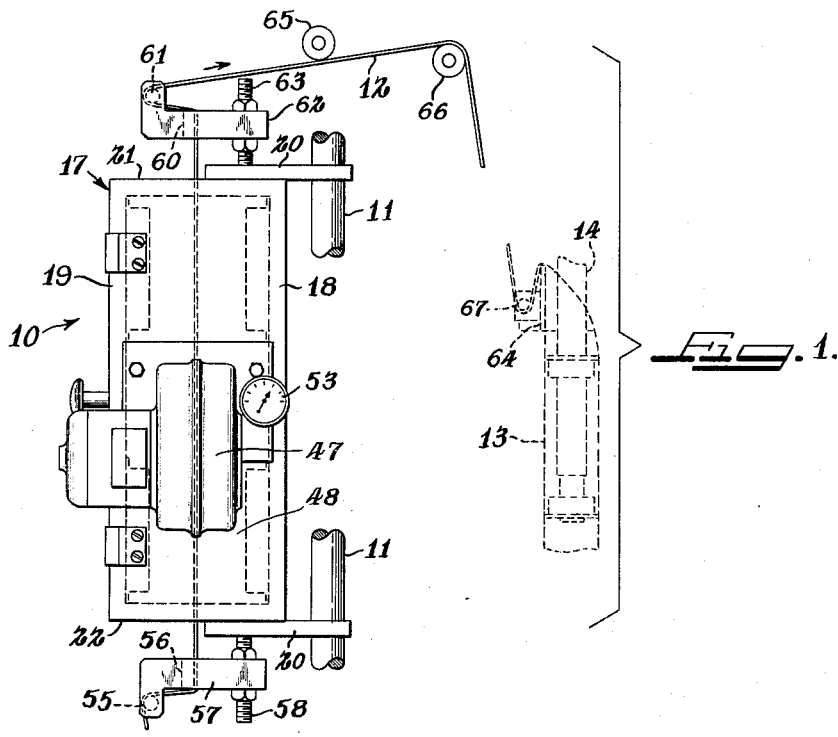
INVENTOR.
ROBERT O. DORR
BY
Cromwell, Greist & Warden
Attys.

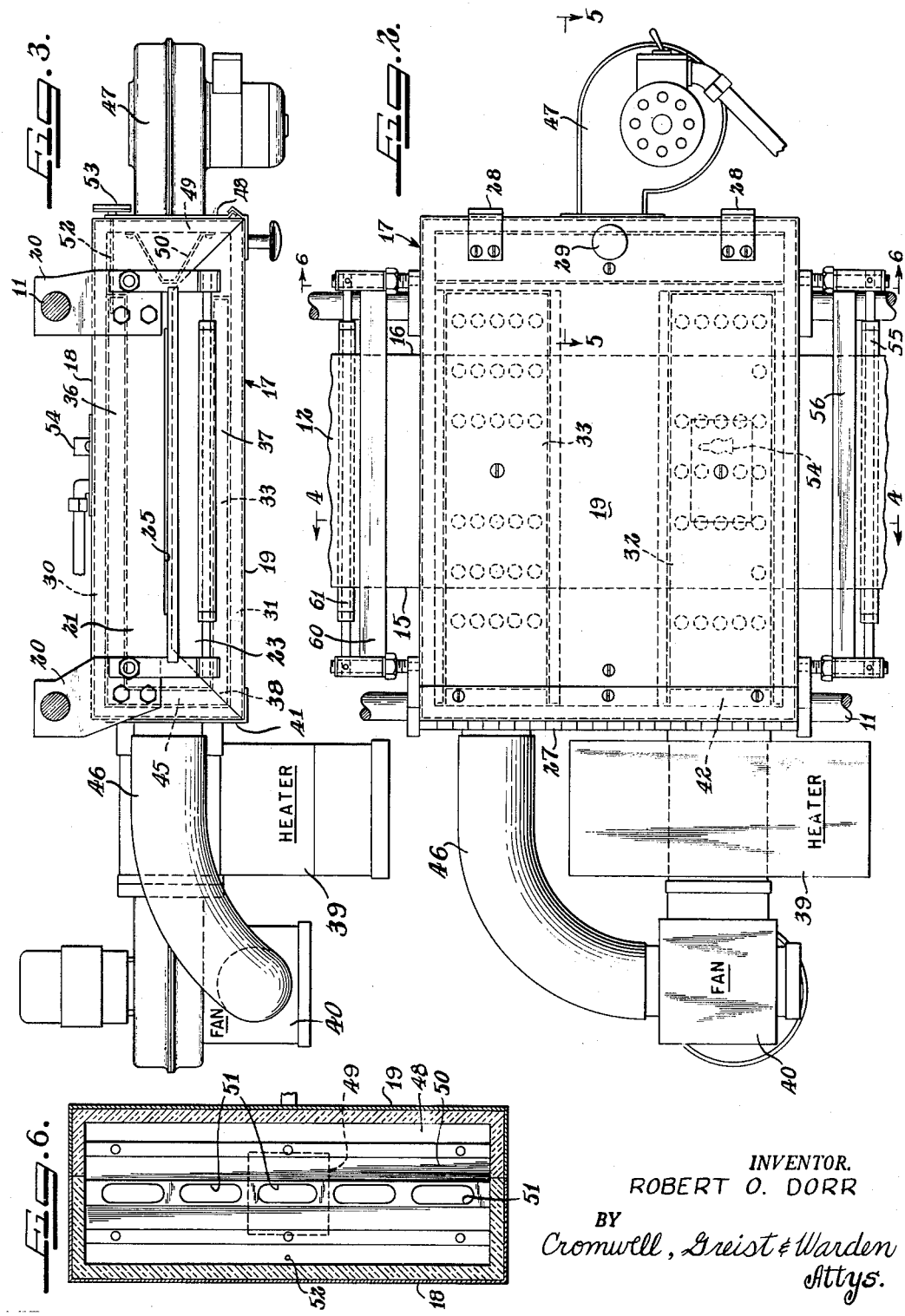

United States Patent Office 3,254,427
Patented June 7, 1966

3,254,427
FILM TREATING APPARATUS
Robert O. Dorr, Mount Prospect, Ill., assignor to Oscar Mayer & Co., Inc., Chicago, Ill., a corporation of Illinois
Filed July 23, 1962, Ser. No. 211,641
8 Claims. (Cl. 34—155)

This invention relates to packaging and is more particularly concerned with apparatus for treating a plastic film preliminary to the use thereof in a packaging operation.

Machines of various kinds have heretofore been developed for packaging a large variety of products in films which are formed from plastics of various kinds. One types of such packaging machines involves the forming of a continuous web of plastic film about a mandrel so as to produce a continuous tube with overlapping margins of the film being sealed to provide a seam extending longitudinally of the tube, generally with the seam being produced by heat applied by a sealing bar or the like. Subsequently, the tube thus formed is filled with a product, divided into sections of predetermined length and each section closed at opposite ends thereof to form individual packages. Generally, it is the practice to supply the film from a continuous roll which has been obtained from a film manufacturer and which, as a result of storage conditions or the like, is most often found to have lost some of its original flatness, so that the length of its margins varies. This results in wrinkling of the longer margin when overlapped and formed into a seam and not infrequently a high percentage of defective packages are produced. Efforts have been made to condition the film so as to obtain uniformity in the length of its side edges or margins and eliminate the wrinkling which otherwise occurs in the seam. However, none of the arrangements heretofore provided have been entirely successful and it is a general object of the present invention to provide an apparatus for treating the film so that when it reaches the forming mandrel it is in a flat condition and its edges have the same length.

It is a more specific object of the invention to provide an apparatus for treating a plastic film which is capable of elongation and/or contraction when heated and which will remain in elongated or contracted condition upon cooling wherein the apparatus comprises a heated cabinet through which the film is drawn and associated mechanism for controlling the temperature in the cabinet and for applying tension to the film sufficient to bring the film into into a flattened condition with its margins of uniform length.

These and other objects and advantages of the invention will be apparent from a consideration of the apparatus which is shown by way of illustration in the accompanying drawings wherein:

FIGURE 1 is a side elevation of an apparatus for treating a plastic film which incorporates therein the principal features of the invention, the apparatus being shown mounted on a packaging machine;

FIGURE 2 is a front elevational view of the apparatus of FIGURE 1;

FIGURE 3 is a top plan view of the apparatus of FIGURE 1;

FIGURE 4 is a vertical section taken on the line 4—4 of FIGURE 2;

FIGURE 5 is a fragmentary horizontal section taken on the line 5—5 of FIGURE 2;

FIGURE 6 is a vertical section taken on the line 6—6 of FIGURE 2; and

FIGURE 7 is a wiring diagram.

Referring particularly to FIGURE 1 of the drawings, the illustrated apparatus 10 is particularly designed for use in treating films which are employed in continuous tube packaging machines of the type which are illustrated in Patent No. 2,831,302, granted April 22, 1958. The film which is employed in the packaging operation may be, for example, "Saran," "Pliofilm," polyethylene, or like films capable of stretching and/or shrinking when heated to a softening temperature and placed under tension.

The apparatus 10 is supported on vertically extending post members 11 forming part of the supporting frame for the machine and the plastic film 12 is passed through the apparatus 10 just prior to forming the film into a tube 13 on a hollow forming mandrel indicated at 14 which constitutes part of the packaging machine. The tube 13 is formed by overlapping the marginal edges 15 and 16 (FIGURE 2) of the film 12 and heat sealing the overlapped margins so as to form a continuous tube which is drawn in the longitudinal direction of the mandrel by a suitable feed mechanism (not shown).

The apparatus 10 comprises a cabinet-like housing 17 having a body forming section 18 and a cover forming section or door 19. The cabinet 18 is rectangular in section, both vertically and horizontally, when it is mounted on the vertical support posts 11, as shown in the drawings, by means of the brackets 20 which are attached to the exterior of the top and bottom walls 21 and 22. The cabinet body 18 has its top and bottom walls 21 and 22 cut out at the front sides thereof so as to accommodate the top and bottom walls 23 and 24 on the door 19 and to provide vertically aligned slot forming recesses 25 and 26 for the film 12 to pass upwardly through the cabinet, the slots or recesses 25 and 26 being open for threading of the film 12 when the door 19 is open.

The door 19 is hinged at 27 to the side edge of the cabinet body 18 and provided at the opposite edge with spring latches 28 and knob 29 so that the door may be readily opened and also latched when in closed position. The cabinet body 18 and the door 19 are both lined with suitable heat insulating material as indicated at 30 and 31.

The cabinet 17 is provided with hot air supply ducts 32 and cold air return ducts 33 which are disposed one above the other. The ducts 32 and 33 are U-shaped and are each made in two parts 34, 35 and 36, 37 with the parts 34 and 36 being secured in the body 18 of the cabinet and the parts 35 and 37 being secured on the inside face of the door 19 of the cabinet. The duct sections 34 and 36 are L-shaped and when the door 19 is closed the sections 35 and 37 are connected to the respective L-shaped sections by a separable mitered joint adjacent the hinge 27 as indicated at 38 in FIGURE 3.

A hot air heater in a housing 39 and a motor driven fan in housing 40 are mounted on the one side wall 41 of the body 18 of the cabinet with an opening 42 through the cabinet side wall 41 providing for passage of hot air from the housing 39 into the lower duct 32 where it passes through openings indicated at 43 and 43' (FIGURES 2 and 4) in the walls of the duct 34, 35 and circulates in the cabinet, passing out of the same through the holes 44 and 44' in the opposed walls of the duct 33 and out of the cabinet through a hole 45 in the side wall 41 which communicates with the duct 33 and conduit 46, the latter being a return or cold air duct leading to the fan housing 40 so as to provide for circulation of the hot air in the cabinet.

A motor driven cold air fan is mounted in the housing 47 (FIGURES 3, 5 and 6) secured on the opposite side wall 48 of the cabinet body 18 and connected by opening 49 with a duct 50 which is formed by a member of truncated cone cross section secured to the inside of wall 48 with its innermost face being apertured at 51 to permit passage of cold air around the film 12 when the hot air is shut off so as to prevent damage to the film through latent heat in the cabinet. A thermometer 52 (FIGURE 5) is supported in the cabinet 17 with a temperature indicating dial 53. A thermostatic control is provided for the heater which is connected to the cabinet 17 as indicated at 54 (FIGURE 3) so that the hot air is supplied to the cabinet at the desired temperature.

The film 12 is supported adjacent the bottom of the cabinet on a roller 55 and a pressure bar 56 which extend between a pair of brackets 57 secured by bolts 58 to the bottom wall 22 of the cabinet body 18. The film 12 is supported adjacent the top of the cabinet on a pressure bar 60 and roller 61, both of which are mounted on a pair of spaced brackets 62 secured on the cabinet top wall 21 by bolts 63. The top and bottom pressure bars 56 and 60 are mounted on the supporting brackets so that they may be adjusted to bring them into parallel relation. The film 12 is guided and supported between the cabinet 17 and a folding plate 64 adjacent the mandrel 14 by suitable supporting rollers 65, 66 and 67, or the like.

The heater 39 and its associated fan unit 40 and the cold air fan 47 are all electrically connected by a suitable circuit as illustrated in FIGURE 7 so as to maintain the temperature in the cabinet 17 at a predetermined level during feed of the film 12. When the feed of the film 12 is discontinued, the hot air fan 40 and heater 39 are shut off automatically and the cold air fan 47 is turned on to flush out of the cabinet the hot air and prevent damage to the section of the film which remains in the cabinet so that upon restarting of the film feed there is no loss of film.

In using the apparatus, the cabinet 17 is mounted on a suitable portion of the frame of the wrapping machine and the film is threaded through the cabinet as shown in FIGURES 1 and 4. The film is fed by rollers or any other suitable feeding means. The heater and hot air fan are turned on as the film begins to feed and the proper temperature is maintained by the thermostatically controlled heater to soften the film sufficiently to permit it to streach on the short side while the long side, which is not under any tension, through its plastic memory tends to shrink. By adjusting the heat and tension on the film, when the forces on each edge become equal, the film is brought into flattened condition and fed to the forming mandrel for the packaging operations. The use of the equipment permits packaging operations to be carried out, for example, in a relatively cold room and with a cold product without the film twisting at the forming plate 64 and with proper overlapping of even margins which results in leakproof sealing. While the apparatus has been disclosed as employed in connection with a wrapping for flattening film which is to be used in a packaging operation, it will be understood that the apparatus may be used to condition a film for any other use where flatness and edges of the same length are desired.

While particular materials and specific details of construction are referred to in connection with the apparatus illustrated, it will be understood that other materials and equivalent details of construction may be employed within the spirit of the invention.

I claim:

1. An apparatus for treating a continuous plastic film which is characterized by changes in length when softened by heat and tensioned, said apparatus comprising a cabinet having a body portion and a door constituting one side of the cabinet which, when closed, forms with the body a heat tunnel with elongate slots in oppositely disposed cabinet walls to permit passage of the film through the tunnel, said cabinet having its walls lined with heat insulating material, means forming ducts in the cabinet having apertured wall portions disposed on opposite sides of the path of the film, an air heater and a fan connected to the cabinet for supplying hot air to the ducts and to circulate the hot air along opposite faces of a film fed through the tunnel, and means for automatically controlling the operation of the heater and fan so as to control the temperature of the hot air in the tunnel.

2. An apparatus for treating plastic film of substantial width which is adapted for use in a wrapping machine and which is capable of changing its length when in a heat softened state, said apparatus comprising a relatively small cabinet adapted to be mounted on the wrapping machine, said cabinet having a body portion and a hingedly mounted door constituting one side of the cabinet with film accommodating slots at opposite ends of the door which slots are open at one side thereof, when the door is open, for threading the film through said cabinet, means forming a U-shaped warm air duct within one end of the cabinet having perforated inner wall, a fan and air heater mounted on the cabinet for delivering heated air to said warm air duct, means forming a U-shaped return duct within the opposite end of said cabinet also having perforated inner walls, a conduit connecting said return duct with said fan so as to provide for circulation of air through said cabinet, said U-shaped ducts being aligned with each other and straddling a film extending through the slots in said cabinet, means forming a cold air duct in said cabinet having a perforated inner wall, and a power driven fan mounted on said cabinet for delivering air to said cold air duct when circulation of the warm air is discontinued whereby to purge the cabinet of warm air.

3. An apparatus as recited in claim 2, and means to draw the film through the cabinet so as to apply tension in the longitudinal direction to the film.

4. An apparatus as recited in claim 2, and parallel pressure bars adjacent the slots in said cabinet, and means for pulling the film over said pressure bars so as to stretch the film while it is in heat softened condition.

5. An apparatus for treating plastic film which is capable of changing its length when in a heat softened state, said apparatus comprising a cabinet having a body portion and a hingedly mounted door constituting a side of the cabinet with film accommodating slots at top and bottom ends of the door which slots are open at one side thereof, when the door is open, for threading the film through the cabinet, a U-shaped warm air duct within the bottom end of the cabinet having perforated inner walls, a fan mounted on the cabinet and having means for delivering heated air to said warm air duct, a U-shaped return duct within the top end of said cabinet also having perforated inner walls, a conduit connecting said return duct with said fan so as to provide for circulation of warm air through said cabinet, said U-shaped ducts extending in the same direction and being positioned so as to straddle a film extending through the slots in said cabinet, a cold air duct in said cabinet having a perforated inner wall, and a power driven fan mounted on said cabinet for delivering air to said cold air duct when circulation of the hot air is discontinued whereby to purge the cabinet of hot air.

6. An apparatus for treating plastic film which is capable of changing its length when in a heat softened condition, said apparatus comprising a cabinet having a body portion and a hingedly mounted door with film accommodating slots at top and bottom ends of the cabinet which slots are opened at one side thereof, when the door is open, for threading the film, means forming a U-shaped warm air duct in the bottom end of the cabinet having perforated inner walls, a fan mounted on the cabinet and having means for delivering air to said warm air duct, an air heating mechanism associated with said fan, means forming a U-shaped return duct in the top end of said cabinet also having perforated inner walls, a conduit connecting said return duct with said fan so as to provide for circulation of air through said cabinet, said U-shaped ducts being disposed one above the other so as to straddle a film extending through the slots in said cabinet, means forming a cold air duct extending vertically in said cabinet and having a perforated inner wall, and a power driven fan mounted on said cabinet for delivering air to said cold air duct.

7. An apparatus for treating a continuous plastic film which is characterized by changes in length when softened by heat and tensioned, said apparatus comprising a vertically disposed cabinet having a body portion and a door which, when closed, forms with the body a heat tunnel, said cabinet having slots in oppositely disposed walls to permit movement of a web of the film through the tunnel, means forming air circulating ducts in the cabinet which are spaced at opposite ends of the tunnel along the longitudinal path of travel of the film and which straddle the film with apertured wall portions disposed on opposite sides of the path of travel of the film, a fan connected to the duct which is nearest the film entrance slot for driving air through the ducts so as to circulate the air along opposite faces of a film fed through the tunnel, an air heater associated with said fan, and thermostatic control means for automatically controlling the operation of the heater when the fan is operating so as to control the temperature of the air delivered by the fan to the tunnel.

8. An apparatus as recited in claim 7, and a second fan connected to the cabinet for supplying cold air to the tunnel, and means operative to automatically turn off the first mentioned fan and the heater and turn on the second mentioned fan when the movement of the film is discontinued.

References Cited by the Examiner

UNITED STATES PATENTS

| | | | |
|---|---|---|---|
| 2,473,404 | 6/1949 | Young | 34—151 X |
| 2,509,279 | 5/1950 | Sisson | 34—155 X |
| 2,532,032 | 11/1950 | Offen | 34—155 X |
| 2,584,043 | 1/1952 | Oberly | 34—155 X |
| 2,807,096 | 9/1957 | Kullgren | 34—66 X |
| 2,807,097 | 9/1957 | Kullgren | 34—48 |
| 2,920,399 | 1/1960 | Fry | 34—160 X |
| 2,952,078 | 9/1960 | Litzler | 34—54 |
| 2,955,342 | 10/1960 | Litzler | 34—54 |
| 3,156,812 | 11/1964 | Forman et al. | 34—225 X |

WILLIAM F. O'DEA, *Primary Examiner.*

NORMAN YUDKOFF, *Examiner.*

J. P. ROBINSON, C. R. REMKE, *Assistant Examiners.*